(12) United States Patent
Ying et al.

(10) Patent No.: US 12,515,631 B2
(45) Date of Patent: Jan. 6, 2026

(54) BRAKING SYSTEM, BRAKING METHOD, AND VEHICLE

(71) Applicant: SHENZHEN YINWANG INTELLIGENT TECHNOLOGIES CO., LTD., Shenzhen (CN)

(72) Inventors: Zhuofan Ying, Shanghai (CN); Xing Wang, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 519 days.

(21) Appl. No.: 17/941,752

(22) Filed: Sep. 9, 2022

(65) Prior Publication Data
US 2023/0001905 A1 Jan. 5, 2023

Related U.S. Application Data

(63) Continuation of application No. PCT/CN2020/078416, filed on Mar. 9, 2020.

(51) Int. Cl.
*B60T 8/40* (2006.01)
*B60T 7/04* (2006.01)
(Continued)

(52) U.S. Cl.
CPC .............. *B60T 13/686* (2013.01); *B60T 7/04* (2013.01); *B60T 8/409* (2013.01); *B60T 13/588* (2013.01);
(Continued)

(58) Field of Classification Search
CPC ...... B60T 8/3635; B60T 8/409; B60T 13/686; B60T 2270/402
See application file for complete search history.

(56) References Cited

U.S. PATENT DOCUMENTS 5,588,718 A * 12/1996 Winner .................. B60T 8/363
303/114.1
12,172,615 B2 * 12/2024 Leiber .................. B60T 13/686
(Continued)

FOREIGN PATENT DOCUMENTS

CN 101879891 A 11/2010
CN 102294997 A 12/2011
(Continued)

OTHER PUBLICATIONS

Machine translation of JP7-205794, retrieved Dec. 28, 2024 (Year: 2024).*

(Continued)

*Primary Examiner* — Bradley T King
(74) *Attorney, Agent, or Firm* — Fish & Richardson P.C.

(57) ABSTRACT

A braking system includes a pedal assembly, a hydraulic assembly, a reversing assembly, a driving wheel assembly, a pedal feel simulator, and a first electronic control unit. The first electronic control unit is electrically connected to the reversing assembly, and controls the reversing assembly to switch a working location. The reversing assembly includes at least two working locations. When the reversing assembly is at a first working location, a brake fluid output port of the hydraulic assembly is connected to the driving wheel assembly through the reversing assembly. When the reversing assembly is at a second working location, the first electronic control unit is electrically connected to the driving wheel assembly, and controls the driving wheel assembly to provide brake force.

20 Claims, 6 Drawing Sheets

(51) Int. Cl.
  *B60T 13/58* (2006.01)
  *B60T 13/68* (2006.01)
  *B60T 13/70* (2006.01)
  *B60T 8/36* (2006.01)

(52) U.S. Cl.
  CPC ............ *B60T 13/70* (2013.01); *B60T 8/3635* (2013.01); *B60T 2270/402* (2013.01)

(56) References Cited

U.S. PATENT DOCUMENTS

| | | | |
|---|---|---|---|
| 2002/0067071 A1* | 6/2002 | Kusano | B60T 7/042 303/113.4 |
| 2005/0162010 A1* | 7/2005 | Kamiya | B60T 8/409 303/3 |
| 2006/0202551 A1* | 9/2006 | Gottwick | B60T 8/4081 303/116.1 |
| 2007/0205659 A1 | 9/2007 | Hatano | |
| 2012/0306260 A1* | 12/2012 | Ohkubo | B60T 13/662 303/14 |
| 2021/0122349 A1* | 4/2021 | Leiber | B60T 13/662 |
| 2022/0105918 A1* | 4/2022 | Leiber | B60T 13/64 |
| 2024/0294158 A1* | 9/2024 | Leiber | B60T 13/686 |

FOREIGN PATENT DOCUMENTS

| | | |
|---|---|---|
| CN | 202130438 U | 2/2012 |
| CN | 203246457 U | 10/2013 |
| CN | 107458365 A | 12/2017 |
| CN | 107738638 A | 2/2018 |
| CN | 108162943 A | 6/2018 |
| CN | 108189824 A | 6/2018 |
| CN | 106114483 B | 1/2019 |
| CN | 109606340 A | 4/2019 |
| CN | 109733356 A | 5/2019 |
| CN | 110182187 A | 8/2019 |
| CN | 209191932 U | 8/2019 |
| CN | 110662680 A | 1/2020 |
| DE | 102018111451 A1 | 11/2019 |
| JP | 07205794 A * | 8/1995 |

OTHER PUBLICATIONS

Office Action in Chinese Appln. No. 202080004921.9, dated Aug. 25, 2021, 21 pages (with English translation).
Extended European Search Report in European Appln No. 20924068.8, dated Mar. 1, 2023, 7 pages.
International Search Report and Written Opinion in International Appln. No. PCT/CN2020/078416, mailed on Dec. 1, 2020, 16 pages (with English translation).

* cited by examiner

BRAKING SYSTEM, BRAKING METHOD, AND VEHICLE

CROSS-REFERENCE TO RELATED APPLICATIONS

This application is a continuation application of International Patent Application No. PCT/CN2020/078416, filed on Mar. 9, 2020, the disclosure of which is hereby incorporated by reference in its entirety.

TECHNICAL FIELD

This application relates to the field of vehicle braking devices, and in particular, to a braking system, a braking method, and a vehicle.

BACKGROUND

A braking system, as one of the important parts of a vehicle, is directly related to comprehensive performance of the vehicle and security of life and property. The braking system of the vehicle has undergone several changes and improvements, from leather friction brake to drum and disc brakes, then to a mechanical anti-lock braking system, and then to an analog electronic anti-lock braking system with the development of electronics technologies. Research on a brake-by-wire (BBW) emerges in recent years.

The brake-by-wire includes an electro-hydraulic brake (EHB) and an electro-mechanical brake (EMB). The EHB, developed on the basis of a conventional hydraulic brake, operates by driving a hydraulic system via a motor. However, it is difficult to integrate the EHB with another electronic control system due to the difficulty of its hydraulic production and electronic control. In contrast, the EMB discards a hydraulic device and uses an electronic-mechanical system instead. The EMB has high respond speed, thus a braking distance is greatly shortened. In addition, the EMB has no hydraulic system and is therefore simplified and lightweight, facilitating integration of functions such as electronic parking, anti-lock, and brake force allocation. However, the EMB is insufficient in system security and reliability as it has no mechanical failure protection device.

In order to resolve the safety and reliability problem of the EMB, a hybrid braking system based on hydraulic pressure and electronic machinery may be used. Still, the existing scheme can only use the conventional hydraulic brake for the front wheels and the EMB for the rear wheels. In this scheme, when the vehicle is in a normal working condition, because the front wheel retains the hydraulic brake, the braking system is still complex, with high costs while no full play to advantages of the EMB.

SUMMARY

This application provides a braking system, an assembly method, a braking method, and a vehicle, so that when a vehicle is in a normal working condition or a non-complete failure working condition, brake force is provided entirely by an electro-mechanical braking system, without depending on a hydraulic system. When the vehicle is in a complete failure working condition, brake force can be provided by the hydraulic system in a manner that a driver steps on a brake pedal.

According to a first aspect, this application provides a braking system, which may include a pedal assembly, a hydraulic assembly, a reversing assembly, a driving wheel assembly, a pedal feel simulator, and a first electronic control unit (ECU). The pedal assembly is connected to an input push rod of the hydraulic assembly, and the first ECU is electrically connected to the reversing assembly, and controls the reversing assembly to switch a working location. The reversing assembly includes at least two working locations. When the reversing assembly is at a first working location, the braking system is in a complete failure working condition, and a brake fluid output port of the hydraulic assembly is connected to the driving wheel assembly through the reversing assembly. The input push rod generates displacement under action of the pedal assembly, so that a brake fluid in the hydraulic assembly flows into the driving wheel assembly, and the driving wheel assembly is driven by the brake fluid to provide brake force. When the reversing assembly is at a second working location, the braking system is in a normal working condition or a non-complete failure working condition, the brake fluid output port of the hydraulic assembly is connected to the pedal feel simulator through the reversing assembly. The pedal feel simulator is configured to generate feedback force of the pedal assembly, the first ECU is electrically connected to the driving wheel assembly, and controls the driving wheel assembly to provide brake force. It can be known from the first aspect that, in the normal working condition or the non-complete failure working condition, step motion of a brake pedal is entirely decoupled from establishment of brake torque. When a vehicle is in the normal working condition or the non-complete failure working condition, brake force is provided entirely by an electro-mechanical braking system, without depending on a hydraulic system. When the vehicle is in the complete failure working condition, brake force can be provided by the hydraulic system in a manner that a driver steps on the brake pedal.

Optionally, with reference to the first aspect, in a first possible implementation, the driving wheel assembly includes a front wheel assembly and a rear wheel assembly. When the reversing assembly is at the first working location, the brake fluid output port of the hydraulic assembly is connected to the front wheel assembly through the reversing assembly. When the reversing assembly is at the second working location, the first ECU controls the front wheel assembly and the rear wheel assembly to provide brake force. It can be learned from the first possible implementation of the first aspect that, when the vehicle is in the normal working condition or the non-complete failure working condition, independent control of brake torque of four wheels is implemented through the electro-mechanical braking system. When the vehicle is in a complete failure condition, a hydraulic device is disposed on the front wheel assembly, so that the system establishes a mechanical-hydraulic connection relationship. Therefore, security is improved.

Optionally, with reference to the first aspect, in a second possible implementation, the driving wheel assembly includes a front wheel assembly and a rear wheel assembly. When the reversing assembly is at the first working location, the brake fluid output port of the hydraulic assembly is connected to the rear wheel assembly through the reversing assembly. When the reversing assembly is at the second working location, the first ECU controls the front wheel assembly and the rear wheel assembly to provide brake force.

Optionally, with reference to the first aspect, in a third possible implementation, the driving wheel assembly includes a front wheel assembly and a rear wheel assembly. When the reversing assembly is at the first working location, the brake fluid output port of the hydraulic assembly is connected to the front wheel assembly and the rear wheel assembly through the reversing assembly. When the reversing assembly is at the second working location, the first ECU controls the front wheel assembly and the rear wheel assembly to provide brake force.

Optionally, with reference to the first to the third possible implementations of the first aspect, in a fourth possible implementation, the reversing assembly is a two-position three-way reversing valve. It can be learned from the fourth possible implementation of the first aspect that, a specific reversing assembly is provided. This increases diversity of the solution.

Optionally, with reference to the fourth possible implementation of the first aspect, in a fifth possible implementation, the two-position three-way reversing valve includes one oil inlet and two oil outlets, and the brake fluid output port of the hydraulic assembly is connected to the oil inlet of the two-position three-way reversing valve. When the reversing assembly is at the first working location, one oil outlet of the two-position three-way reversing valve is connected to the driving wheel assembly. When the reversing assembly is at the second working location, the other oil outlet of the two-position three-way reversing valve is connected to the pedal feel simulator.

Optionally, with reference to the first to the fifth possible implementations of the first aspect, in a sixth possible implementation, the front wheel assembly may include two front wheels and a first electro-mechanical brake (EMB) brake actuator. The first EMB brake actuator is respectively mounted on each wheel of the two front wheels, and the first EMB brake actuator may include a brake wheel cylinder. When the reversing assembly is at the first working location, the brake fluid output port of the hydraulic assembly is connected to the brake wheel cylinder through the reversing assembly, and the input push rod generates displacement under action of the pedal assembly, so that a brake fluid in the hydraulic assembly flows into the brake wheel cylinder, and the brake wheel cylinder is driven by the brake fluid to provide brake force for two front wheels. It can be learned from the sixth possible implementation of the first aspect that: A specific structure of the front wheel assembly is given. In a complete failure condition, a driver may step on a brake pedal, and a liquid in a brake master cylinder may flow into the brake wheel cylinder of two front wheel assemblies, to establish a mechanical connection. In a complete failure condition, the driver steps on the brake pedal to generate enough brake force.

Optionally, with reference to the sixth possible implementation of the first aspect, in a seventh possible implementation, the rear wheel assembly may include two rear wheels and a second EMB brake actuator, and the second EMB brake actuator is respectively mounted on each wheel of the two rear wheels. When the reversing assembly is at the second working location, the first ECU sends an instruction to the first EMB brake actuator and the second EMB brake actuator based on a brake signal. The first EMB brake actuator provides brake force for the two front wheels according to the instruction. The second EMB brake actuator provides brake force for the two rear wheels according to the instruction, where the brake signal includes a displacement signal obtained by a pedal travel sensor of the pedal assembly.

Optionally, with reference to the first to the seventh possible implementations of the first aspect, in an eighth possible implementation, the hydraulic assembly includes a brake master cylinder in which a brake fluid is stored, and a cross-sectional area of the brake wheel cylinder is greater than that of the brake master cylinder. In this way, a cross-sectional area ratio (a cross-sectional area $A2$ of the brake wheel cylinder/a cross-sectional area of a brake master cylinder $A1$) can be used to amplify the brake control force. This ensures that sufficient failure brake force is generated. Specifically, input force $F1$=area $A1$*pressure P, and output force $F2$=area $A2$*pressure P. The input force is the brake control force. When $A1$ is reduced, larger pressure may be generated. Because a feature of hydraulic transmission is that pressure is equal everywhere, larger output force may be generated.

Optionally, with reference to the first to the eighth possible implementations of the first aspect, in a ninth possible implementation, the rear wheel assembly includes two rear wheels and a second EMB brake actuator, and the second EMB brake actuator is respectively mounted on each wheel of the two rear wheels. When the reversing assembly is at the second working location, the first ECU sends the instruction to the first EMB brake actuator and the second EMB brake actuator based on the brake signal. The first EMB brake actuator provides brake force for the two front wheels according to the instruction. The second EMB brake actuator provides brake force for the two rear wheels according to the instruction, where the brake signal includes an instruction of an advanced driver assistant system (ADAS).

Optionally, with reference to the first to the ninth possible implementations of the first aspect, in a tenth possible implementation, the braking system further includes a first one-way valve and a second one-way valve. The first one-way valve is disposed on a pipe between the hydraulic assembly and the front wheel assembly, and a conduction direction of the first one-way valve is a direction from the front wheel assembly to the hydraulic assembly. The second one-way valve is disposed on a pipe between the hydraulic assembly and the pedal feel simulator, and a conduction direction of the second one-way valve is a direction from the pedal feel simulator to the hydraulic assembly. It can be known from the tenth possible implementation of the first aspect that, when the brake pedal is released, the one-way valve may assist the system in quickly releasing pressure.

According to a second aspect, this application provides a braking method, where a first electronic control unit (ECU) obtains a brake signal, and the first ECU controls, based on the brake signal, a reversing assembly to switch a working location. When the reversing assembly is at a first working location, a brake fluid output port of the hydraulic assembly is connected to a driving wheel assembly through the reversing assembly. When the reversing assembly is at a second working location, the brake fluid output port of the hydraulic assembly is connected to the pedal feel simulator through the reversing assembly, and the first ECU controls the driving wheel assembly to provide brake force. It can be learned from the second aspect that the first ECU controls switching of the working location of the reversing assembly, so as to implement switching of a brake source in different working conditions. Specifically, when the system is in a power-on state, that is, when the system is in a normal working condition or a non-complete failure working condition, the first ECU controls the reversing assembly to be at the second working location, and the system adopts electro-mechanical brake. When the system is in a power-off state, that is, when the system is in a complete failure working condition, the system adopts hydraulic brake.

Optionally, with reference to the second aspect, in a first possible implementation, that a first electronic control unit (ECU) obtains a brake signal includes: The first ECU receives a displacement signal obtained by a pedal travel sensor of a pedal assembly. The first ECU determines the brake signal based on the displacement signal.

Optionally, with reference to the second aspect, in a second possible implementation, the first ECU obtains the brake signal based on an instruction of an advanced driver assistant system (ADAS).

Optionally, with reference to the second aspect or the first to the second possible implementations of the second aspect, in a third possible implementation, the driving wheel assembly includes a front wheel assembly and a rear wheel assembly. When the reversing assembly is at a second working location, the first ECU controls the front wheel assembly and the rear wheel assembly to provide brake force.

Optionally, with reference to the second aspect or the first to the second possible implementations of the second aspect, in a fourth possible implementation, the reversing assembly is a two-position three-way reversing valve.

Optionally, with reference to the third possible implementation or the fourth possible implementation of the second aspect, in a fifth possible implementation, when the reversing assembly is at the second working location, the first ECU sends a brake instruction to a first electro-mechanical brake (EMB) brake actuator of the front wheel assembly and a second EMB brake actuator of the rear wheel assembly based on the brake signal.

According to a third aspect, this application provides an assembly method, and the method may include: connecting a pedal assembly to an input push rod of a hydraulic assembly; and connecting a brake fluid output port of the hydraulic assembly to a driving wheel assembly by using a first working location of a reversing assembly, where the input push rod generates displacement under action of the pedal assembly, so that a brake fluid in the hydraulic assembly flows into the driving wheel assembly, and the driving wheel assembly is driven by the brake fluid to generate brake force; and connecting the brake fluid output port of the hydraulic assembly to a pedal feel simulator by using a second working location of the reversing assembly, where the input push rod generates displacement under action of the pedal assembly to make the brake fluid in the hydraulic assembly flow into the pedal feel simulator, the pedal feel simulator is configured to generate feedback force of the pedal assembly, and a first electronic control unit (ECU) controls, based on an obtained brake signal, a front wheel assembly and a rear wheel assembly to provide brake force.

Optionally, with reference to the third aspect, in a first possible implementation, the driving wheel assembly includes a front wheel assembly and a rear wheel assembly. When the reversing assembly is at the first working location, the brake fluid output port of the hydraulic assembly is connected to the front wheel assembly through the reversing assembly. When the reversing assembly is at the second working location, the first ECU controls the front wheel assembly and the rear wheel assembly to provide brake force. It can be learned from the first possible implementation of the third aspect that, when a vehicle is in a normal working condition or a non-complete failure working condition, independent control of brake torque of four wheels is implemented through an electro-mechanical braking system. When the vehicle is in a complete failure condition, a hydraulic device is disposed on the front wheel assembly, so that the system establishes a mechanical-hydraulic connection relationship. Therefore, security is improved.

Optionally, with reference to the third aspect, in a second possible implementation, the driving wheel assembly includes a front wheel assembly and a rear wheel assembly. When the reversing assembly is at the first working location, the brake fluid output port of the hydraulic assembly is connected to the rear wheel assembly through the reversing assembly. When the reversing assembly is at the second working location, the first ECU controls the front wheel assembly and the rear wheel assembly to provide brake force.

Optionally, with reference to the third aspect, in a third possible implementation, the driving wheel assembly includes a front wheel assembly and a rear wheel assembly. When the reversing assembly is at the first working location, the brake fluid output port of the hydraulic assembly is connected to the front wheel assembly and the rear wheel assembly through the reversing assembly. When the reversing assembly is at the second working location, the first ECU controls the front wheel assembly and the rear wheel assembly to provide brake force.

Optionally, with reference to the first to the third possible implementations of the third aspect, in a fourth possible implementation, the reversing assembly is a two-position three-way reversing valve. It can be learned from the fourth possible implementation of the third aspect that, a specific reversing assembly is provided. This increases diversity of the solution.

Optionally, with reference to the fourth possible implementation of the third aspect, in a fifth possible implementation, the two-position three-way reversing valve includes one oil inlet and two oil outlets, and the brake fluid output port of the hydraulic assembly is connected to the oil inlet of the two-position three-way reversing valve. When the reversing assembly is at the first working location, one oil outlet of the two-position three-way reversing valve is connected to the driving wheel assembly. When the reversing assembly is at the second working location, the other oil outlet of the two-position three-way reversing valve is connected to the pedal feel simulator.

Optionally, with reference to the first to the fifth possible implementations of the third aspect, in a sixth possible implementation, the front wheel assembly may include two front wheels and a first electro-mechanical brake (EMB) brake actuator. The first EMB brake actuator is respectively mounted on each wheel of the two front wheels, and the first EMB brake actuator may include a brake wheel cylinder. When the reversing assembly is at the first working location, the brake fluid output port of the hydraulic assembly is connected to the brake wheel cylinder through the reversing assembly, and the input push rod generates displacement under action of the pedal assembly, so that a brake fluid in the hydraulic assembly flows into the brake wheel cylinder, and the brake wheel cylinder is driven by the brake fluid to provide brake force for two front wheels. It can be learned from the sixth possible implementation of the third aspect that: A specific structure of the front wheel assembly is given. In a complete failure condition, a driver may step on a brake pedal, and a liquid in a brake master cylinder may flow into the brake wheel cylinder of two front wheel assemblies, to establish a mechanical connection. In a complete failure condition, the driver steps on the brake pedal to generate enough brake force.

Optionally, with reference to the sixth possible implementation of the third aspect, in a seventh possible implementation, the rear wheel assembly may include two rear wheels and a second EMB brake actuator, and the second EMB brake actuator is respectively mounted on each of the two rear wheels. When the reversing assembly is at the second working location, the first ECU sends an instruction to the first EMB brake actuator and the second EMB brake actuator based on a brake signal. The first EMB brake actuator provides brake force for the two front wheels according to the instruction. The second EMB brake actuator provides brake force for the two rear wheels according to the instruction, where the brake signal includes a displacement signal obtained by a pedal travel sensor of the pedal assembly.

Optionally, with reference to the first to the seventh possible implementations of the third aspect, in an eighth possible implementation, the hydraulic assembly includes a brake master cylinder in which a brake fluid is stored, and a cross-sectional area of the brake wheel cylinder is greater than that of the brake master cylinder.

Optionally, with reference to the first to the eighth possible implementations of the third aspect, in a ninth possible implementation, the rear wheel assembly includes two rear wheels and a second EMB brake actuator, and the second EMB brake actuator is respectively mounted on each wheel of the two rear wheels. When the reversing assembly is at the second working location, the first ECU sends the instruction to the first EMB brake actuator and the second EMB brake actuator based on the brake signal. The first EMB brake actuator provides brake force for the two front wheels according to the instruction. The second EMB brake actuator provides brake force for the two rear wheels according to the instruction, where the brake signal includes an instruction of an advanced driver assistant system (ADAS).

Optionally, with reference to the first to the ninth possible implementations of the third aspect, in a tenth possible implementation, the braking system further includes a first one-way valve and a second one-way valve. The first one-way valve is disposed on a pipe between the hydraulic assembly and the front wheel assembly, and a conduction direction of the first one-way valve is a direction from the front wheel assembly to the hydraulic assembly. The second one-way valve is disposed on a pipe between the hydraulic assembly and the pedal feel simulator, and a conduction direction of the second one-way valve is a direction from the pedal feel simulator to the hydraulic assembly. It can be known from the tenth possible implementation of the third aspect that, when the brake pedal is released, the one-way valve may assist the system in quickly releasing pressure.

According to a fourth aspect, this application provides a vehicle, where the vehicle may include a braking system, and the braking system is the braking system according to any one of the first aspect or the possible implementations of the first aspect.

According to the technical solution provided in this application, when the vehicle is in the normal working condition or the non-complete failure working condition, brake-by-wire is implemented based on the EMB, and the hydraulic assembly does not intervene in a brake process, so that an advantage of the EMB is fully utilized. When the vehicle is in the complete failure working condition, loop switching is implemented through the reversing assembly, so that the hydraulic assembly is connected. This implements failure protection through the hydraulic system.

DESCRIPTION OF EMBODIMENTS

The following describes embodiments of this application with reference to the accompanying drawings. It is clear that the described embodiments are merely some rather than all of the embodiments of this application. A person of ordinary skill in the art may learn that, with technology development and emergence of a new scenario, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the data used in such a way are interchangeable in proper circumstances so that embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those modules, but may include other modules not expressly listed or inherent to such a process, method, system, product, or device. Naming or numbering of steps in this application does not mean that the steps in a method procedure need to be performed in a time/logical order indicated by the naming or numbering. An execution order of the steps in the procedure that have been named or numbered can be changed based on a technical objective to be achieved, provided that same or similar technical effects can be achieved. Division into the modules in this application is logical division. In actual application, there may be another division manner. For example, a plurality of modules may be combined or integrated into another system, or some features may be ignored or not performed. In addition, the displayed or discussed mutual coupling or direct coupling or communication connection may be implemented through some ports, and the indirect coupling or communication connection between modules may be in an electrical form or another similar form. This is not limited in this application. In addition, modules or sub-modules described as separate components may be or may not be physically separated, or may be or may not be physical modules, or may not be distributed on a plurality of circuit modules. Objectives of the solutions of this application may be achieved by selecting some or all of the modules according to actual requirements.

In this application, unless otherwise specified and limited, the terms such as "mount", "link", "connect", "fasten", and "dispose" should be understood broadly. For example, the term "connect" may be a fixed connection, may be a detachable connection, or may be integration; may be a mechanical connection or may be an electrical connection; or may be a direct connection, may be an indirect connection implemented by using an intermediate medium, or may be communication inside two elements or an interaction relationship between two elements. A person of ordinary skill in the art may interpret specific meanings of the foregoing terms in this application according to specific cases.

This embodiment of this application provides an EMB with failure protection. In a normal working condition or a non-complete failure condition, electro-mechanical brake-by-wire is implemented based on one controller and four EMB brake actuators, and no hydraulic system is required for force transfer. A controller is also referred to as an electronic control unit (ECU) in some scenarios. The non-complete failure working condition means that the system is degraded due to a fault, but does not entirely lose a working capability. For example, a threshold may be generally set. For example, when the threshold is set to 0.5 g, a deceleration capability is greater than the threshold, that is, the non-complete failure working condition. When the deceleration capability is less than the threshold, it is considered as a complete failure working condition. In the complete failure working condition, a driver may step on a brake pedal, and a front wheel hydraulic assembly provides brake force, to ensure basic safety and meet a regulatory requirement. The following describes a structure of a braking system provided in an embodiment of this application from a perspective of a scenario with reference to the normal working condition and the complete failure working condition. It should be noted that a system working principle in a scenario of the non-complete failure working condition is the same as a system working principle in the normal working condition. For understanding, refer to the working principle in the normal working condition. Details are not described again in this application.

Figure 1:
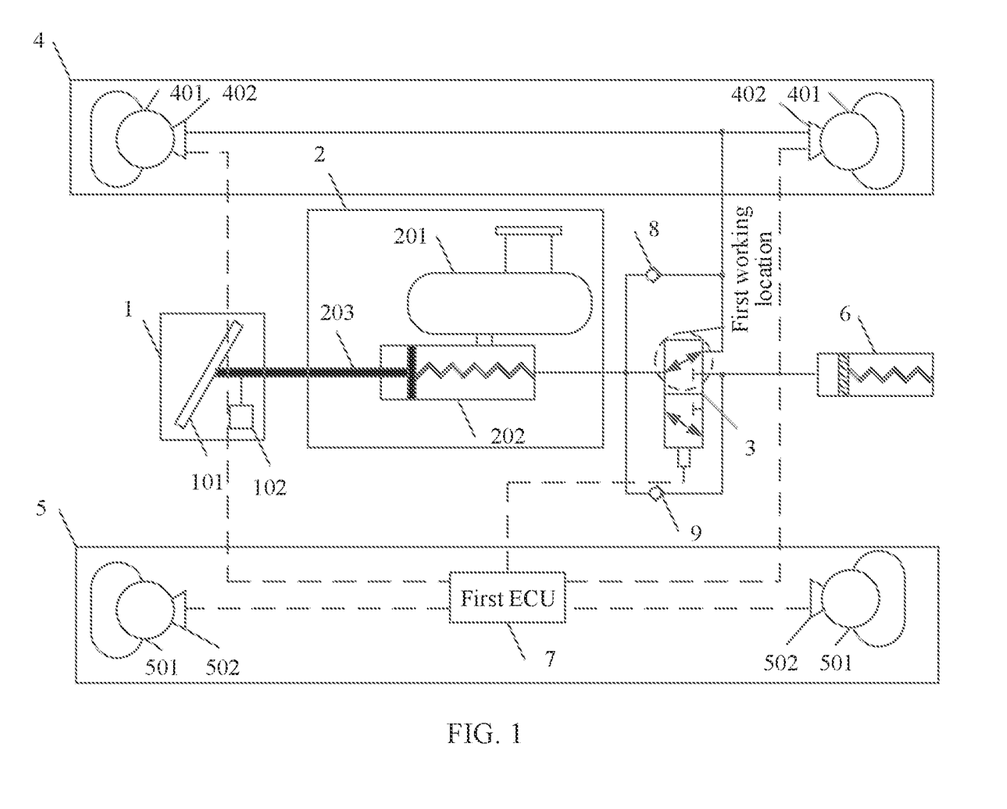
FIG. 1 is a schematic diagram of a structure of a braking system according to an embodiment of this application.

FIG. 1 is a schematic diagram of a structure of a braking system according to an embodiment of this application. A braking system provided in an embodiment of this application may include a pedal assembly 1, a hydraulic assembly 2, a reversing assembly 3, a front wheel assembly 4, a rear wheel assembly 5, a pedal feel simulator 6, and a first electronic control unit (ECU) 7.

The pedal assembly may include a brake pedal 101. In a specific implementation, the pedal assembly may further include the brake pedal 101 and a pedal travel sensor 102. The pedal travel sensor 102 is mounted on the brake pedal 101. Alternatively, the pedal travel sensor 102 is mounted on an input push rod 203. An output end of the pedal travel sensor 102 is connected to the first ECU 7. The pedal travel sensor 102 may send an obtained displacement signal to the first ECU 7. The pedal travel sensor 102 is a displacement sensor, configured to feel a travel stepped on by a driver when the brake pedal 101 is stepped down, and transmit a sensing signal to the first ECU 7. The first ECU 7 may determine a brake requirement of a vehicle based on the signal sent by the pedal travel sensor 102, and control a wheel assembly and the like to work to provide brake force for the vehicle. The pedal assembly 1 is connected to the input push rod 203 of the hydraulic assembly 2. The hydraulic assembly 2 may include a fluid reservoir 201 and a brake master cylinder 202. An output end of the fluid reservoir 201 is connected to a brake fluid inlet of the brake master cylinder 202. The fluid reservoir 201 stores a brake fluid, and the brake fluid is sometimes referred to as hydraulic oil, and the name is not limited in this embodiment of this application. The fluid reservoir 201 is configured to replenish the brake master cylinder 202. A brake fluid outlet (also referred to as a brake fluid output port) of the brake master cylinder 202 is connected to the reversing assembly 3 through a pipe, and a function of the reversing assembly 3 is to control conduction, blocking, and a flow direction of the brake fluid. In this application, the reversing assembly 3 can control at least two flow directions of the brake fluid. In a specific implementation, the reversing assembly may be a two-position three-way reversing valve, or the reversing assembly may be another device that can control conduction, blocking, and the flow direction of the brake fluid. The reversing assembly includes at least two working locations. FIG. 1 shows that the reversing assembly is the two-position three-way reversing valve.

As shown in FIG. 1, when the two-position three-way reversing valve is at a first working location, the brake fluid outlet of the brake master cylinder 202 of the hydraulic assembly 2 is connected to the front wheel assembly 4 through the two-position three-way reversing valve, and the brake fluid outlet of the brake master cylinder 202 of the hydraulic assembly 2 is connected to an oil inlet of the two-position three-way reversing valve. The two-position three-way reversing valve includes two oil outlets. When the two-position three-way reversing valve is at the first working location, one of the oil outlets of the two-position three-way reversing valve is connected to the front wheel assembly 4. Specifically, the front wheel assembly 4 may include two front wheels 401 and a first EMB brake actuator 402. The first EMB brake actuator 402 is separately mounted on the two front wheels 401. In a specific implementation, the first EMB brake actuator 402 is mounted on a wheel edge of the front wheel. In this application, the EMB brake actuator is sometimes referred to as an EMB actuator for short. When the two-position three-way reversing valve is at the first working location, the brake fluid outlet of the brake master cylinder 202 is connected to a brake wheel cylinder of a first EMB brake actuator of two front wheels through the two-position three-way reversing valve. A structure of the first EMB brake actuator is described below with reference to FIG. 3. The two-position three-way reversing valve is connected to the first ECU 7, and the first ECU 7 may control a working location of the two-position three-way reversing valve. Specifically, when the reversing assembly is at the first working location, the first ECU 7 controls the two-position three-way reversing valve to be in a power-off state, and at a second working location, the first ECU 7 controls the two-position three-way reversing valve to be in a power-on state.

Figure 2:
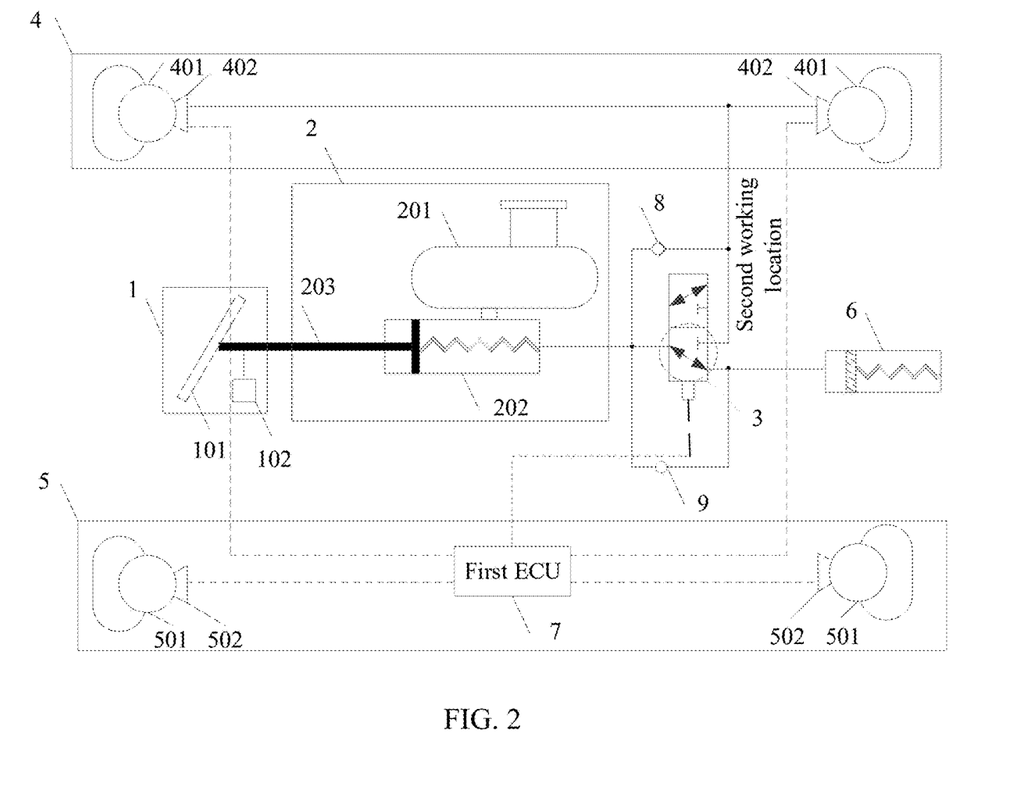
FIG. 2 is a schematic diagram of another structure of a braking system according to an embodiment of this application.

FIG. 2 is a schematic diagram of a structure of a braking system according to this application. When a two-position three-way reversing valve is at a second working location, a brake fluid outlet of the brake master cylinder 202 of the hydraulic assembly 2 is connected to the pedal feel simulator 6 through the two-position three-way reversing valve.

In a specific implementation, a one-way valve 8 and a one-way valve 9 may be further included. The one-way valve 8 is disposed on a pipe between the hydraulic assembly and the front wheel assembly, and a conduction direction of the one-way valve 8 is a direction from the front wheel assembly to the hydraulic assembly. The one-way valve 9 is arranged on a pipe between the hydraulic assembly and the pedal feel simulator, and a conduction direction of the one-way valve 9 is a direction from the pedal feel simulator to the hydraulic assembly. When the brake pedal 101 is released, the one-way valve may assist the system in quickly releasing pressure.

Figure 3:
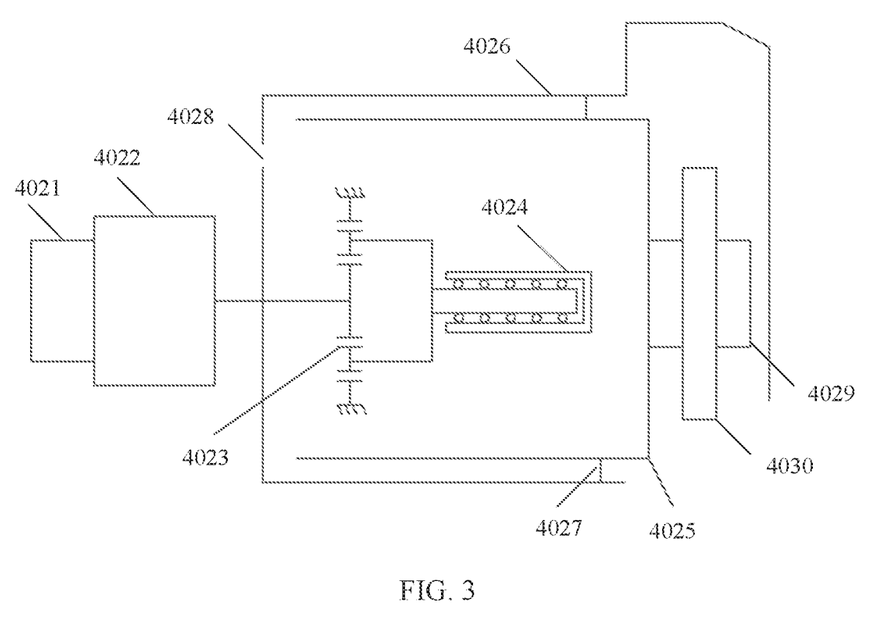
FIG. 3 is a schematic diagram of a structure of an EMB actuator according to an embodiment of this application.

Working Principles:

When the reversing assembly is at a first working location, a vehicle is in a complete failure working condition, and the input push rod 203 generates displacement under action of the pedal assembly 1, so that a brake fluid in the hydraulic assembly 2 flows into the front wheel assembly 4. Specifically, a brake fluid in the brake master cylinder 202 of the hydraulic assembly 2 flows into a brake wheel cylinder of the first EMB brake actuator 402 of the front wheel assembly 4, and the brake wheel cylinder is driven by the brake fluid to provide brake force for the wheels. FIG. 3 is a schematic diagram of a structure of an EMB actuator according to an embodiment of this application. The first EMB brake actuator 402 may include a second ECU 4021, a motor 4022, a planetary gear mechanism 4023, a ball screw mechanism 4024, a brake wheel cylinder 4025, a brake housing 4026, a sealing ring 4027, an oil inlet 4028, a friction plate 4029 and a brake disc 5030. The planetary gear mechanism 4023 and the ball screw mechanism 4024 may also be referred to as a transmission mechanism. The planetary gear mechanism 4023, the ball screw mechanism 4024, the brake wheel cylinder 4025, the friction plate 4029, and the brake disc 4030 are all accommodated in the brake housing 4026, and the transmission mechanism is integrated in the brake wheel cylinder 4025. The oil inlet 4028 is connected to a brake oil pipe, that is, connected to the first EMB brake actuator 402 shown in FIG. 1 and FIG. 2. When a reversing assembly is at a first working location, a vehicle is in a complete failure working condition, and a driver steps on a pedal, so that a brake fluid in the hydraulic assembly enters the brake wheel cylinder 4025 through the oil inlet 4028. The sealing ring 4027 is configured to prevent oil leakage from a gap between the brake wheel cylinder 4025 and the brake housing 4026. Driven by the brake fluid, the brake wheel cylinder 4025 presses the friction plate 4029 and the brake disc 4030 tightly. This implements brake through friction between the friction plate 4029 and the brake disc 4030.

In a specific implementation, a cross-sectional area of the brake wheel cylinder 4025 is greater than a cross-sectional area of the brake master cylinder 202. In this way, a cross-sectional area ratio (a cross-sectional area A2 of the brake wheel cylinder/a cross-sectional area of a brake master cylinder A1) can be used to amplify the brake control force. This ensures that sufficient failure brake force is generated. Specifically, input force F1=area A1*pressure P. and output force F2=area A2*pressure P. The input force is the brake control force. When A1 is reduced, larger pressure may be generated. Because a feature of hydraulic transmission is that pressure is equal everywhere, larger output force may be generated.

A location relationship among the second ECU 4021, the motor 4022, the planetary gear mechanism 4023, and the ball screw mechanism 4024, and a location relationship between the friction plate 4029 and the brake disc 4030 are the conventional technology. This is not specifically limited in this embodiment of this application.

When the reversing assembly is at a second working location, when a vehicle is in a normal working condition or a non-complete failure working condition, the input push rod generates displacement under action of the pedal assembly, so that a brake fluid in the hydraulic assembly flows into the pedal feel simulator 6. The pedal feel simulator is used to generate feedback force of the pedal assembly. Brake pedal feeling refers to feedback of the pedal to a driver's foot during a brake process. A brake-by-wire system cancels the conventional hydraulic, pneumatic, and mechanical force transmission mechanisms, so that pedal displacement and pressure greatly differ from those of the conventional braking system under a same brake working condition. In this case, it is difficult for the driver to feel and control. Therefore, the pedal feel simulator 6 needs to be additionally disposed to simulate a special effect of the brake pedal, so that the driver may have a good feel of control during the brake process and accurately master a magnitude of applied brake force.

The first ECU 7 controls, according to an obtained brake signal, the front wheel assembly 4 and the rear wheel assembly 5 to provide brake force. In a specific implementation, the brake signal may include a displacement signal obtained by the pedal travel sensor 102. In a specific implementation, for example, in an intelligent driving scenario, the brake signal may further include an instruction of an upper-layer advanced driver assistant system (ADAS). The ADAS includes driver assistant functions such as a pre-collision security function, an adaptive cruise control function, and a lane keeping assistant function. These driver assistant functions are constructed in a same vehicle to help the driver avoid a collision, follow a vehicle ahead, or keep own vehicle in its lane. In a specific implementation, the brake signal may alternatively be other information related to a vehicle status. For example, the brake signal may alternatively be a steering wheel angle, a wheel speed signal, longitudinal acceleration (a driving direction of the vehicle at a current moment is a longitudinal direction), transverse acceleration, or drive motor torque.

Figure 4:
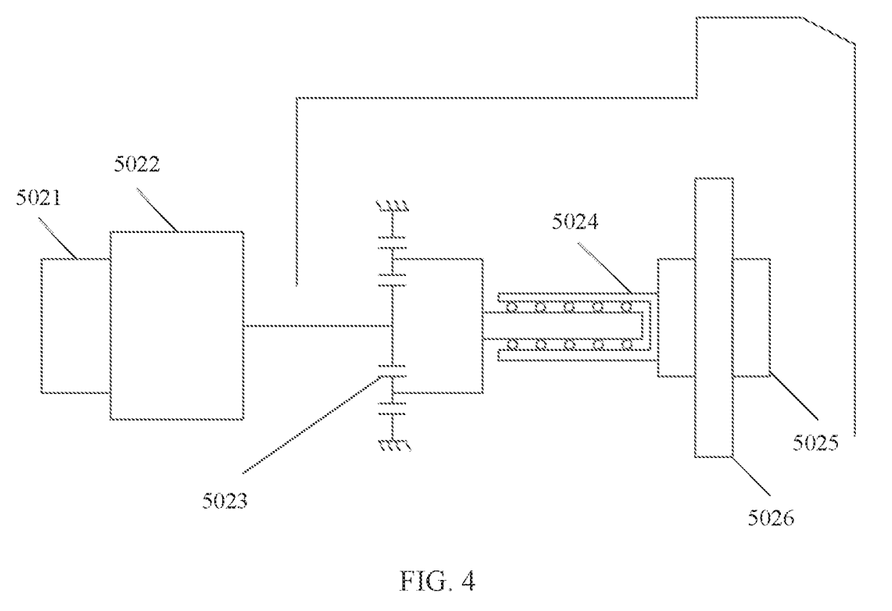
FIG. 4 is a schematic diagram of another structure of an EMB actuator according to an embodiment of this application.

The rear wheel assembly 5 includes two rear wheels 501 and a second EMB brake actuator 502. The second EMB brake actuator 502 is mounted on each wheel of the two rear wheels. In a specific implementation, the second EMB brake actuator 502 is mounted on a wheel edge of the rear wheel. FIG. 4 is a schematic diagram of a structure of an EMB actuator according to this application. As shown in FIG. 4, the second EMB brake actuator 502 includes a third ECU 5021, a motor 5022, a planetary gear mechanism 5023, a ball screw mechanism 5024, a friction plate 5025, and a brake disc 5026. The planetary gear mechanism 5023 and the ball screw mechanism 5024 may also be referred to as a transmission mechanism.

The second ECU 4021 of the first EMB brake actuator receives an instruction from the first ECU 7 to drive the motor 4022 to work, and amplifies and applies force on the friction plate through the planetary gear mechanism 4023 and the ball screw mechanism 4024. In this way, brake is implemented by friction between the friction plate 4029 and the brake disc 5030.

The third ECU 5021 of the second EMB actuator receives an instruction from the first ECU 7 to drive the motor 5022 to work, and amplifies and applies force on the friction plate through the planetary gear mechanism 5023 and the ball screw mechanism 5024. In this way, brake is implemented by friction between the friction plate 5025 and the brake disc 5026.

A location relationship among the third ECU 5021, the motor 5022, the planetary gear mechanism 5023, and the ball screw mechanism 5024, and a location relationship between the friction plate 5025 and the brake disc 5026 are the conventional technology. This is not specifically limited in this embodiment of this application.

When a reversing assembly is at a second working location, during manual driving, a driver steps on the brake pedal 101, so that a brake fluid flows into the pedal feel simulator 6 to generate counter force of the pedal. The first ECU 7 determines a driving intent based on a signal sent by the pedal travel sensor 102, and independently controls the first EMB brake actuator and the second EMB actuator to work to generate brake force. During intelligent driving, the first ECU 7 may independently control, based on an instruction of an upper-layer ADAS, the first EMB brake actuator and the second EMB actuator to work, to generate brake force.

Figure 5:
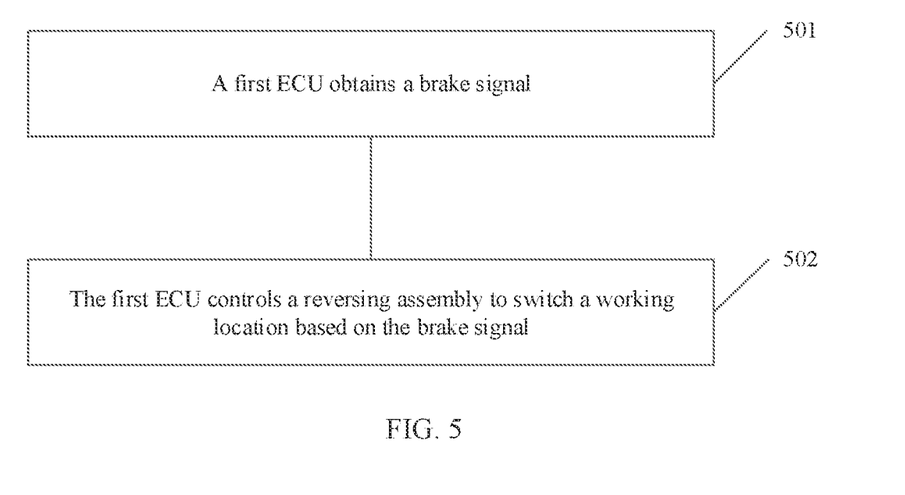
FIG. 5 is a schematic flowchart of a brake control method according to an embodiment of this application.

Refer to FIG. 5, an embodiment of this application further provides an assembly method. The assembly method may include the following steps.

A first ECU obtains a brake signal.

Specifically, the brake signal may include one or more of an instruction of an upper-layer ADAS, a signal obtained by the pedal travel sensor 102, a steering wheel angle, a wheel speed signal, longitudinal acceleration and transverse acceleration. In addition, the brake signal may further include some other wheel status information, for example, drive motor torque.

The first ECU controls a reversing assembly to switch a working location based on the brake signal.

When the reversing assembly is at a first working location, a brake fluid output port of the hydraulic assembly is connected to a driving wheel assembly through the reversing assembly. When the reversing assembly is at a second working location, the brake fluid output port of the hydraulic assembly is connected to a pedal feel simulator through the reversing assembly, and the first ECU controls the driving wheel assembly to provide brake force.

In a specific implementation, the driving wheel assembly includes a front wheel assembly and a rear wheel assembly. When the reversing assembly is at the second working location, the first ECU controls the front wheel assembly and the rear wheel assembly to provide brake force.

In a specific implementation, the reversing assembly is a two-position three-way reversing valve.

In a specific implementation, when the reversing assembly is at the second working location, the first ECU sends a brake instruction to a first electro-mechanical brake (EMB) brake actuator of the front wheel assembly and a second EMB brake actuator of the rear wheel assembly based on the brake signal. The brake signal includes a displacement signal obtained by the pedal travel sensor of the pedal assembly.

In a specific implementation, when the reversing assembly is at the second working location, the first ECU sends a brake instruction to a first electro-mechanical brake (EMB) brake actuator of the front wheel assembly and a second EMB brake actuator of the rear wheel assembly based on the brake signal. The brake signal includes an instruction of an advanced driver assistant system (ADAS).

In a specific implementation, when determining that a deceleration capability is less than a preset value based on the brake signal, the first ECU controls the reversing assembly to switch to the first working location. When determining that a deceleration capability is greater than a preset value based on the brake signal, the first ECU controls the reversing assembly to switch to the second working location. For example, a threshold may be generally set. For example, when the threshold is set to 0.5 g, the deceleration capability is greater than the threshold, that is, a non-complete failure working condition. When the first ECU determines that deceleration capability is greater than 0.5 g based on the brake signal, the first ECU controls the reversing assembly to switch to the second working location, to adopt EMB brake. When the deceleration capability is less than the threshold, it is considered as a complete failure working condition. When the first ECU determines that deceleration capability is less than 0.5 g based on the brake signal, the first ECU controls the reversing assembly to switch to the first working location. In the complete failure working condition, a driver may step on a brake pedal, and a front wheel hydraulic assembly provides brake force, to ensure basic safety and meet a regulatory requirement.

Figure 6:
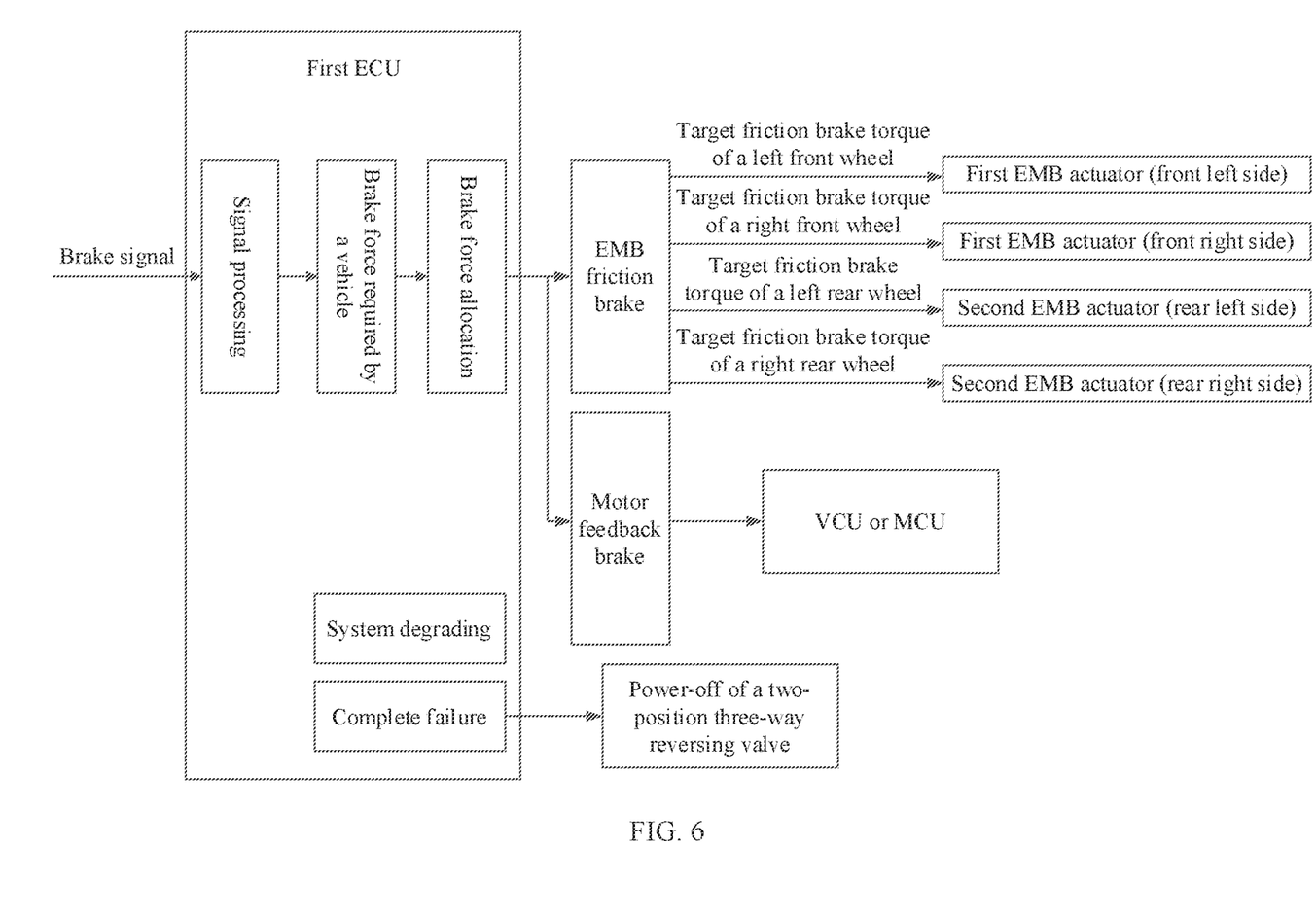
FIG. 6 is a schematic flowchart of a brake control method according to an embodiment of this application.

How the first ECU 7 controls the EMB actuator to work is the conventional technology. To better understand the technical solutions provided in this application, the following provides descriptions with reference to FIG. 6. FIG. 6 is a schematic flowchart of a brake control method according to an embodiment of this application. The first ECU 7 may perform processing based on the brake signal mentioned above, to calculate brake force required by a vehicle. Specifically, the brake signal may include an instruction of an upper-layer ADAS, a signal obtained by the pedal travel sensor 102, a steering wheel angle, a wheel speed signal, longitudinal acceleration, transverse acceleration, and the like. In addition, the brake signal may further include some other wheel status information, for example, drive motor torque. After determining the brake force required by the vehicle, the first ECU allocates the brake force, and sends control instructions to second ECU and third ECU in EMB brake actuators of four wheels, to implement independent control of brake torques of the four wheels. To implement more flexible control of an intelligent vehicle, the use of independent electro-mechanical actuators of the four wheels can better meet needs of a future vehicle. The brake force allocation may include energy recovery control, and coordinated allocation of EMB friction brake force and motor feedback brake force. The EMB friction brake force is friction force generated when a motor of the EMB actuator works and pushes a friction plate to clamp a brake disc. The motor feedback brake force obtained through brake force allocation is motor brake force that may be generated when a new energy vehicle is started through a drive motor of the vehicle, and may implement motor feedback brake through a vehicle control unit (VCU) or a drive motor control unit (MCU). A new energy vehicle such as a pure electric vehicle or a hybrid vehicle is generally equipped with a drive motor and a power battery. When the vehicle brakes, the motor may work in a feedback brake mode required by an electric generator to charge the battery, so as to recycle brake energy that is originally dissipated by friction of a brake pad. In this way, energy efficiency is improved. Energy recovery control refers to coordinated allocation of the EMB friction brake force and motor feedback brake force.

The first ECU 7 is also responsible for failure security management. When four EMB actuators are faulty (for example, EMB actuators of one or two wheels cannot work properly), the system is degraded and enters a limp home mode. The remaining EMB actuators are used to implement brake-by-wire. When the system entirely fails, the first ECU 7 controls a two-position three-way valve to change a working location, closes a loop of the pedal feel simulator 6 that simulates hydraulic characteristics, and opens a backup hydraulic loop of the EMB actuator of the front wheel to ensure a sufficient deceleration capability when the system fails.

According to the braking system provided in this application, in a normal working condition, step motion of the brake pedal is entirely decoupled from establishment of brake torque. A hydraulic system is only used to generate pedal feedback force, and actual brake torque is established by the EMB actuator. This makes full use of all the advantages of the electro-mechanical braking system. In a complete failure working condition, the driver can step on the brake pedal, so that a liquid in a brake master cylinder may flow into brake wheel cylinders of two front wheel EMB actuators to establish a mechanical connection. In the complete failure working condition, the driver can step on the brake pedal to generate enough brake force.

Figure 7:
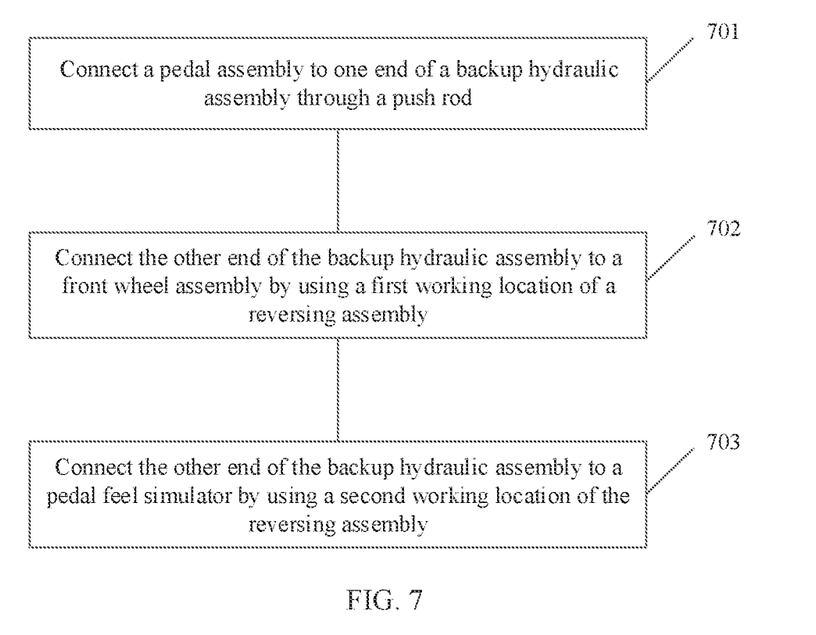
FIG. 7 is a schematic flowchart of an assembly method according to an embodiment of this application.

Refer to FIG. 7, an embodiment of this application further provides an assembly method. The assembly method may include the following steps.

701: Connect a pedal assembly to an input push rod of a hydraulic assembly.

702: Connect a brake fluid output port of the hydraulic assembly to a front wheel assembly by using a first working location of a reversing assembly. The input push rod generates displacement under action of the pedal assembly, so that a brake fluid in the hydraulic assembly flows into the front wheel assembly, and the front wheel assembly is driven by the brake fluid to provide brake force.

703. Connect the brake fluid output port of the hydraulic assembly to a pedal feel simulator by using a second working location of the reversing assembly. The input push rod generates displacement under action of the pedal assembly to make the brake fluid in the hydraulic assembly flow into the pedal feel simulator, the pedal feel simulator is configured to generate feedback force of the pedal assembly, and a first electronic control unit (ECU) controls, based on an obtained brake signal, the front wheel assembly and a rear wheel assembly to provide brake force.

In a specific implementation, the reversing assembly is a two-position three-way reversing valve.

In a specific implementation, the front wheel assembly may include two front wheels and a first electro-mechanical brake (EMB) brake actuator. The first EMB brake actuator is respectively mounted on each wheel of the two front wheels, and the first EMB brake actuator may include a brake wheel cylinder. That connecting the other end of the hydraulic assembly to a front wheel assembly by using a first working location of a reversing assembly may include: connecting the other end of the hydraulic assembly to the brake wheel cylinder by using the first working location of the reversing assembly, where the input push rod generates displacement under action of the pedal assembly, so that the brake fluid in the hydraulic assembly flows into the brake wheel cylinder: and the brake wheel cylinder is driven by the brake fluid to provide brake force for two front wheels.

In a specific implementation, the hydraulic assembly may include a brake master cylinder in which a brake fluid is stored, and a cross-sectional area of the brake wheel cylinder is greater than that of the brake master cylinder.

In a specific implementation, the rear wheel assembly may include two rear wheels and a second EMB brake actuator, and the second EMB brake actuator is respectively mounted on each wheel of the two rear wheels. That a first electronic control unit (ECU) controls, based on an obtained brake signal, the front wheel assembly and the rear wheel assembly to provide brake force may include: The first ECU sends an instruction to the first EMB brake actuator and the second EMB brake actuator based on a brake signal; the first EMB brake actuator provides brake force for the two front wheels according to the instruction; and the second EMB brake actuator provides brake force for the two rear wheels according to the instruction.

In a specific implementation, the pedal assembly may include a brake pedal and a pedal travel sensor, and the brake signal may include a displacement signal obtained by the pedal travel sensor.

In a specific implementation, the brake signal may include an instruction of an advanced driver assistant system (ADAS).

Figure 8:
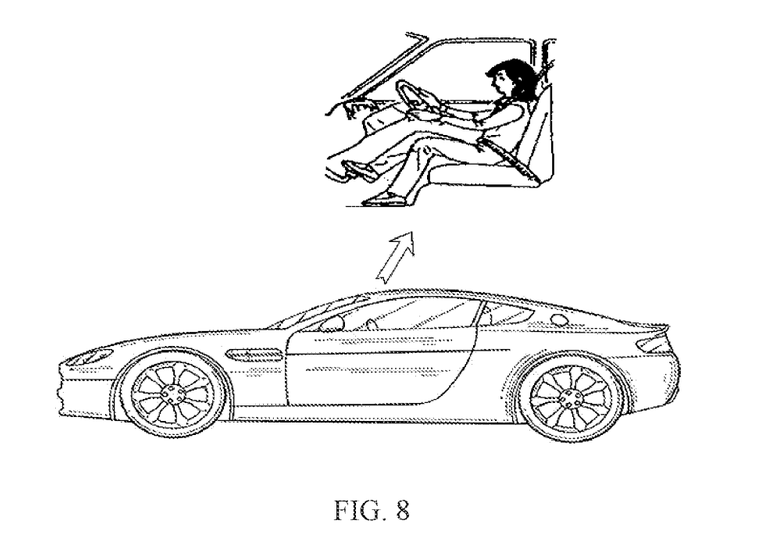
FIG. 8 is a schematic diagram of an application scenario according to an embodiment of this application.

Refer to FIG. 8, this application further provides a vehicle. The vehicle may be a car, a bus, a semi-trailer, an off-road vehicle, a dedicated vehicle, a motor truck, a tractor, a dumping truck, or the like. FIG. 8 is merely the schematic diagram of the vehicle. Specifically, the vehicle may be an electric vehicle, a new energy vehicle, or the like. The braking system described above in FIG. 1 to FIG. 4 is mounted on the vehicle. This application may include three specific application scenarios: the vehicle is in a normal working mode, the vehicle is in a non-complete failure working mode, and the vehicle is in a complete failure working mode. When the vehicle is in the normal working mode or the non-complete failure working mode, independent control on brake torque of four wheels may be implemented based on EMB brake actuators of the four wheels, without relying on a hydraulic system. The pedal feel simulator may be used to provide feedback force of the pedal stepped by a driver. When the vehicle is in the complete failure working mode, the system is powered off. Through the two-position three-way reversing valve, a pedal feel simulator path is closed, and a path between the two front wheels and the hydraulic assembly is opened. The driver may step on the brake pedal to apply the hydraulic brake force to the front wheels to ensure basic safety.

The braking system, the assembly method and the vehicle provided in embodiments of this application are described in detail above. The principles and implementations of this application are described herein by using specific examples. The description about the embodiments is merely provided to help understand the method and core ideas of this application. In addition, a person of ordinary skill in the art can make variations and modifications in terms of the specific implementations and application scopes based on the ideas of this application. Therefore, the content of this specification shall not be construed as a limit to this application.

What is claimed is:
1. A braking system, comprising:
a pedal assembly;
a hydraulic assembly;
a reversing assembly;
a driving wheel assembly;
a pedal feel simulator; and
a first electronic control unit (ECU),
wherein the pedal assembly is connected to an input push rod of the hydraulic assembly, and the first ECU is electrically connected to the reversing assembly, and controls the reversing assembly to switch a working location, and the reversing assembly comprises at least two working locations, wherein:
when the reversing assembly is at a first working location, a brake fluid output port of the hydraulic assembly is connected to the driving wheel assembly through the reversing assembly, and the reversing assembly is configured to guide brake fluid to flow from the hydraulic assembly to the driving wheel assembly via the reversing assembly; and
when the reversing assembly is at a second working location, the brake fluid output port of the hydraulic assembly is connected to the pedal feel simulator through the reversing assembly, and the first ECU is electrically connected to the driving wheel assembly, and controls the driving wheel assembly to provide brake force, wherein the reversing assembly comprises an oil inlet and two oil outlets, wherein a first one-way valve is disposed on a first pipe connecting the oil inlet and a first oil outlet of the two oil outlets, and a second one-way valve is disposed on a second pipe connecting the oil inlet and a second oil outlet of the two oil outlets.

2. The braking system according to claim 1, wherein the driving wheel assembly comprises a front wheel assembly and a rear wheel assembly, wherein:
when the reversing assembly is at the first working location, the brake fluid output port of the hydraulic assembly is connected to the front wheel assembly through the reversing assembly; and
when the reversing assembly is at the second working location, the first ECU controls the front wheel assembly and the rear wheel assembly to provide brake force.

3. The braking system according to claim 2, wherein the reversing assembly is a two-position three-way reversing valve.

4. The braking system according to claim 3, wherein the two-position three-way reversing valve comprises the oil inlet and the two oil outlets, and the brake fluid output port of the hydraulic assembly is connected to the oil inlet of the two-position three-way reversing valve, wherein:
when the reversing assembly is at the first working location, the first oil outlet of the two-position three-way reversing valve is connected to the driving wheel assembly; and
when the reversing assembly is at the second working location, the second oil outlet of the two-position three-way reversing valve is connected to the pedal feel simulator.

5. The braking system according to claim 2, wherein the front wheel assembly comprises two front wheels and two first electro-mechanical brake (EMB) brake actuators, each of the two first EMB brake actuators is respectively mounted on each wheel of the two front wheels, and each of the two first EMB brake actuators comprises a brake wheel cylinder; and
when the reversing assembly is at the first working location, the brake fluid output port of the hydraulic assembly is connected to the brake wheel cylinder of each of the two first EMB brake actuators through the reversing assembly.

6. The braking system according to claim 5, wherein the rear wheel assembly comprises two rear wheels and two second EMB brake actuators, and each of the two second EMB brake actuators is respectively mounted on each wheel of the two rear wheels; and
when the reversing assembly is at the second working location, the first ECU sends an instruction to the two first EMB brake actuators and the two second EMB brake actuators based on a brake signal; the two first EMB brake actuator provide brake force for the two front wheels according to the instruction; and the two second EMB brake actuators provide brake force for the two rear wheels according to the instruction, wherein the brake signal comprises a displacement signal obtained by a pedal travel sensor of the pedal assembly.

7. The braking system according to claim 5, wherein the hydraulic assembly comprises a brake master cylinder in which a brake fluid is stored, and a cross-sectional area of the brake wheel cylinder is greater than that of the brake master cylinder.

8. The braking system according to claim 5, wherein the rear wheel assembly comprises two rear wheels and two second EMB brake actuators, and each of the two second EMB brake actuators is respectively mounted on each wheel of the two rear wheels; and
when the reversing assembly is at the second working location, the first ECU sends an instruction to the two first EMB brake actuators and the two second EMB brake actuators based on a brake signal; the two first EMB brake actuator provide brake force for the two front wheels according to the instruction; and the two second EMB brake actuators provide brake force for the two rear wheels according to the instruction, wherein the brake signal comprises an instruction of an advanced driver assistant system (ADAS).

9. The braking system according to claim 2, wherein the first pipe is placed between the hydraulic assembly and the front wheel assembly, and a conduction direction of the first one-way valve is a direction from the front wheel assembly to the hydraulic assembly, the second pipe is placed between the hydraulic assembly and the pedal feel simulator, and a conduction direction of the second one-way valve is a direction from the pedal feel simulator to the hydraulic assembly.

10. A control method, comprising:
obtaining, by a first electronic control unit (ECU), a brake signal;
controlling, by the first ECU based on the brake signal, a reversing assembly to switch a working location, wherein the reversing assembly comprises at least two working locations, and wherein:
when the reversing assembly is at a first working location, a brake fluid output port of a hydraulic assembly is connected to a driving wheel assembly through the reversing assembly, and the reversing assembly is configured to guide brake fluid to flow from the hydraulic assembly to the driving wheel assembly via the reversing assembly; and
when the reversing assembly is at a second working location, the brake fluid output port of the hydraulic assembly is connected to a pedal feel simulator through the reversing assembly, and the first ECU controls the driving wheel assembly to provide brake force,
wherein the reversing assembly comprises an oil inlet and two oil outlets, wherein a first one-way valve is disposed on a first pipe connecting the oil inlet and a first oil outlet of the two oil outlets, and a second one-way valve is disposed on a second pipe connecting the oil inlet and a second oil outlet of the two oil outlets.

11. The control method according to claim 10, wherein the obtaining, by the first ECU, a brake signal comprises:
receiving, by the first ECU, a displacement signal obtained by a pedal travel sensor of a pedal assembly; and
determining, by the first ECU, the brake signal based on the displacement signal.

12. The control method according to claim 10, wherein the obtaining, by the first ECU, a brake signal comprises:
obtaining, by the first ECU, the brake signal based on an instruction of an advanced driver assistant system (ADAS).

13. The control method according to claim 10, wherein the controlling, by the first ECU based on the brake signal, a reversing assembly to switch a working location comprises:
in response to determining that a deceleration capability is less than a preset value based on the brake signal, controlling, by the first ECU, the reversing assembly to switch to the first working location; or in response to determining that a deceleration capability is greater than a preset value based on the brake signal, controlling, by the first ECU, the reversing assembly to switch to the second working location.

14. The control method according to claim 10, wherein the driving wheel assembly comprises a front wheel assembly and a rear wheel assembly; and when the reversing assembly is at the second working location, the first ECU controls the front wheel assembly and the rear wheel assembly to provide brake force.

15. The control method according to claim 14, wherein:
when the reversing assembly is at the second working location, the first ECU sends a brake instruction to a first electro-mechanical brake (EMB) brake actuator of the front wheel assembly and a second EMB brake actuator of the rear wheel assembly based on the brake signal.

16. A vehicle, wherein the vehicle comprises a braking system, and the braking system comprises:
a pedal assembly;
a hydraulic assembly;
a reversing assembly;
a driving wheel assembly;
a pedal feel simulator; and
a first electronic control unit (ECU);
wherein the pedal assembly is connected to an input push rod of the hydraulic assembly, and the first ECU is electrically connected to the reversing assembly, and controls the reversing assembly to switch a working location, and the reversing assembly comprises at least two working locations, wherein:
when the reversing assembly is at a first working location, a brake fluid output port of the hydraulic assembly is connected to the driving wheel assembly through the reversing assembly, and the reversing assembly is configured to guide brake fluid to flow from the hydraulic assembly to the driving wheel assembly via the reversing assembly; and
when the reversing assembly is at a second working location, the brake fluid output port of the hydraulic assembly is connected to the pedal feel simulator through the reversing assembly, and the first ECU is electrically connected to the driving wheel assembly, and controls the driving wheel assembly to provide brake force, wherein the reversing assembly comprises an oil inlet and two oil outlets, wherein a first one-way valve is disposed on a first pipe connecting the oil inlet and a first oil outlet of the two oil outlets, and a second one-way valve is disposed on a second pipe connecting the oil inlet and a second oil outlet of the two oil outlets.

17. The vehicle according to claim 16, wherein the driving wheel assembly comprises a front wheel assembly and a rear wheel assembly, wherein:
when the reversing assembly is at the first working location, the brake fluid output port of the hydraulic assembly is connected to the front wheel assembly through the reversing assembly; and
when the reversing assembly is at the second working location, the first ECU controls the front wheel assembly and the rear wheel assembly to provide brake force.

18. The vehicle according to claim 17, wherein the reversing assembly is a two-position three-way reversing valve.

19. The vehicle according to claim 18, wherein the two-position three-way reversing valve comprises the oil inlet and the two oil outlets, and the brake fluid output port of the hydraulic assembly is connected to the oil inlet of the two-position three-way reversing valve, wherein
when the reversing assembly is at the first working location, the first oil outlet of the two-position three-way reversing valve is connected to the driving wheel assembly; and
when the reversing assembly is at the second working location, the second oil outlet of the two-position three-way reversing valve is connected to the pedal feel simulator.

20. The vehicle according to claim 19, wherein the front wheel assembly comprises two front wheels and two first electro-mechanical brake (EMB) brake actuators, each of the two first EMB brake actuators is respectively mounted on each wheel of the two front wheels, and each of the two first EMB brake actuators comprises a brake wheel cylinder; and
when the reversing assembly is at the first working location, the brake fluid output port of the hydraulic assembly is connected to the brake wheel cylinder of each of the two first EMB brake actuators through the reversing assembly.

* * * * *